United States Patent [19]

Hartung

[11] Patent Number: 5,232,681
[45] Date of Patent: Aug. 3, 1993

[54] PROCESS FOR THE PREPARATION OF AN ION-CONDUCTION CERAMIC MATERIAL

[75] Inventor: Rüdiger Hartung, Berlin, Fed. Rep. of Germany

[73] Assignee: ABB Patent GmbH, Mannheim, Fed. Rep. of Germany

[21] Appl. No.: 815,263

[22] Filed: Dec. 27, 1991

[30] Foreign Application Priority Data

Dec. 27, 1990 [DE] Fed. Rep. of Germany ........ 4041890

[51] Int. Cl.$^5$ .............................................. C01F 7/04
[52] U.S. Cl. ................................. 423/600; 423/119
[58] Field of Search ................. 423/600, 119; 429/193

[56] References Cited

U.S. PATENT DOCUMENTS

| | | | |
|---|---|---|---|
| 3,895,963 | 7/1975 | McGowan et al. | 429/193 |
| 4,052,538 | 10/1977 | Eddy et al. | 429/193 |
| 4,150,203 | 4/1979 | Liang et al. | 429/193 |
| 4,208,475 | 6/1980 | Paraso et al. | 429/193 |
| 4,339,511 | 7/1982 | Morgan | 429/189 |
| 4,610,866 | 9/1986 | Debsikdar et al. | 423/600 |
| 4,946,664 | 8/1990 | Van Zyl et al. | 423/600 |

*Primary Examiner*—Wayne Langel
*Assistant Examiner*—Steven Bos
*Attorney, Agent, or Firm*—Herbert L. Lerner; Laurence A. Greenberg

[57] ABSTRACT

A process for the preparation of stabilized sodium bet-a''-aluminum oxide from aluminum transition oxides includes applying a phase-stabilizing doping component and another component promoting conductivity and affixing the doping component, to surfaces of aluminum transition oxides and interior areas of pores.

2 Claims, No Drawings

PROCESS FOR THE PREPARATION OF AN ION-CONDUCTION CERAMIC MATERIAL

The invention relates to a process for the preparation of an ion-conducting ceramic material, and more particularly stabilized sodium beta"-aluminum oxide, from aluminum transition oxides having a spinal defect structure.

Sodium beta"-aluminum oxide (Na-$\beta''$-Al$_2$O$_3$) is used, for example, for the manufacture of solid electrolytes which are incorporated as a sodium ion-conducting wall in electrochemical storage batteries. The sodium beta"-aluminum oxide used for the manufacture of solid electrolytes must be in a stabilized state, since otherwise it becomes thermally unstable during the sintering of the solid electrolyte, which is performed at temperatures above 1550° C., and is converted into $\beta$-Al$_2$O$_3$ and $\upsilon$-NaAlO$_2$ of lower conductivity. The preparation of stabilized sodium beta"-aluminum oxide having a high sodium ion conductivity is associated with difficulties even today. An optimum solution has so far not be found.

A process for the preparation of stabilized sodium beta"-aluminum oxide is known from German Published, Non-Prosecuted Application 39 02 175. To that end, a dopant metal oxide, that is chosen from the group consisting of Li$_2$O, MgO, ZnO, CoO, NiO and FeO or a mixture thereof, is dispersed in a cubically very densely packed aluminum oxide or a precursor thereof with the formation of a starting mix. The mix is then heated and calcined in an oxygen-containing atmosphere. Finally, homogeneous sodium oxide is dispersed in the calcined starting mix with the formation of a final mix which is then heated in an oxygen-containing atmosphere to a temperature of at least 1100° C. with the formation of beta"-aluminum oxide.

From the publication JPN. J. APPL. PHYS., 1972, 11, p. 188 et o seq., it is already known that, in order to stabilize sodium beta"-aluminum oxide, doping with Li, Mg, Zn, Co, Ni or Fe must be carried out prior to sintering.

It is accordingly an object of the invention to provide a process for the preparation of an ion-conducting ceramic material, which overcomes the hereinafore-mentioned disadvantages of the heretofore-known methods of this general type, which is suitable for direct reaction sintering at a high rate of heating and which allows the preparation of stabilized $\beta''$-aluminum oxide in as short a time as possible.

With the foregoing and other objects in view there is provided, in accordance with the invention, a process for the preparation of stabilized sodium beta"-aluminum oxide from aluminum transition oxides having a spinal defect structure, which comprises applying at least one impregnation layer in the form of a phase stabilizing doping component and another component promoting ion conductivity and affixing the doping component, to surfaces and interior pore areas of a pulverized aluminum transition oxide or a mixture of a plurality of aluminum transition oxides.

An aluminum transition oxide or a mixture thereof i employed as the starting material. Chi, kappa, gamma, delta, theta or eta-aluminum transition oxides are used as a preference. Aluminum oxide hydrates (for example boehmite) or aluminum hydroxides (for example gibbsite or bayerite), which are then converted to the above-mentioned aluminum transition oxides by thermal dehydroxylation at a temperature of 250° to 1150° C., can also be used as starting a material. In a subsequent treatment, the aluminum transition oxides are converted to a powder having a particle size of 0.1 $\mu$m to 5 $\mu$m.

A phase-stabilizing doping component in the form of a single chemical compound or a mixture of chemical compounds which contain magnesium, lithium, zinc, cobalt, nickel or iron as a component and are completely soluble in a solvent is converted, together with the aluminum transition oxide, into a slip. Those doping components which are completely soluble in water or an alcohol are used as a preference. The amount of the doping component being used is chosen in such a way that its proportion represents 0.05 to 10% by mass of the oxide phases of the sintered sodium beta"-aluminum oxide ceramic material.

Therefore, in accordance with another mode of the invention, there is provided a process which comprises applying cations of metals selected from the group consisting of magnesium, lithium, zinc, cobalt, nickel and iron to form stabilized sodium beta"-aluminum oxide as the doping component, and promoting conductivity and affixing the doping component on exterior areas and interior areas of the pores of the aluminum transition oxides with sodium ions in dissolved form as the other component.

In accordance with a further mode of the invention, there is provided a process which comprises preparing the stabilized sodium beta"-aluminum oxide by forming a slip from an aluminum transition oxide, from a chemical compound being completely soluble in a solvent and containing the doping component, and from the solvent.

In accordance with an added mode of the invention, there is provided a process which comprises preparing the stabilized sodium beta"-aluminum oxide by choosing chemical compounds for the doping component which can be decomposed to oxides in an oxygen-containing atmosphere at temperatures up to a maximum of 900° C., obtaining the other component promoting the conductivity and the fixation from an alkaline solution, and converting the other component to oxide forms at temperatures up to a maximum of 900° C.

In accordance with an additional mode of the invention, there is provided a process which comprises preparing the stabilized sodium beta"-aluminum oxide with a solvent selected from the group consisting of water and an alcohol, and obtaining the other component from an alkaline solution containing sodium ions.

The slip is formed from a defined amount of aluminum transition oxides, doping components and the appropriate amount of a solvent, with water being used as a preference. This slip is ground and then dried. The powder obtained in this manner is stirred into the solution of a sodium compound. The amounts of solids are chosen in such a way that a slip is again formed which can be ground. The purpose of grinding both slips on one hand is to form a powder having a particle size below 5 $\mu$m and on the other hand is to prevent the formation of agglomerates. The two slips can be dried by spray drying, freeze drying or fluidized-bed drying. If the doping component is not precipitated by the sodium-containing solution, the possibility arises of dispensing with the formation of a second slip and admixing the sodium solution directly to the first slip.

Therefore, in accordance with yet another mode of the invention, there is provided a process which comprises preparing the stabilized sodium beta"-aluminum oxide by forming a slip containing aluminum oxides and the doping component in a ratio of substantially 3.01:1, setting a ratio of solvent to solids at least equal to substantially 2.33:1 and wet-grinding and then drying the slip.

In accordance with yet a further mode of the invention, there is provided a process which comprises preparing the stabilized sodium beta''-aluminum oxide by forming a slip from gamma-aluminum transition oxide, magnesium nitrate hexahydrate and water, being wet-ground to a particle size of below 6.5 μm and then dried.

In accordance with yet an added mode of the invention, there is provided a process which comprises preparing the stabilized sodium beta''-aluminum oxide by forming another slip from a resultant powder by mixing with a sodium hydroxide solution and then wet-grinding to a particle size of 5 μm.

In accordance with yet an additional mode of the invention, there is provided a process which comprises forming the stabilized sodium beta''-aluminum oxide in the absence of any precipitation of the doping component by the other component, and stirring the alkaline solution directly into the first-mentioned slip with a solids/liquid ratio being adjusted to at least substantially 2.33:1.

If an organometallic compound is employed as the doping component, then the organic portion must be baked in an oxygen-containing atmosphere at temperatures of 300° to 600° C. before the second slip is formed.

Therefore, in accordance with a concomitant mode of the invention, there is provided a process which comprises forming the stabilized sodium beta''-aluminum oxide by using an organometallic compound as the doping component, and baking an organic portion of the organometallic compound after formation of the powder from the first-mentioned slip, in an oxygen-containing atmosphere at temperatures substantially between 300° and 600° C.

With the aid of the soluble doping component, phase-stabilizing cations are uniformly deposited on the surface of the aluminum transition oxide as well as on the interior areas of its pores. In this way its incorporation in the sintering process can be made substantially easier and the conductivity can be significantly increased. With the aid of the sodium-containing solution, which is preferably sodium hydroxide solution, an additional and uniform deposition of sodium ions on the entire surface is effected and the phase stabilizing cations are affixed to the surface. The solids content of the suspension is adjusted to suit the requirements of the further processing stages, especially drying. The necessary concentration of dissolved components which is required to obtain the target $\beta''$-aluminum oxide phase through reaction sintering is given by the solids content and its composition. A slight excess of sodium can lead to the formation of the sintering-promoting $\upsilon$-NaAlO$_2$/$\beta''$-Al$_2$O$_3$ eutectic.

Due to the process stages described above, the components which promote phase stabilization and conductivity are applied to the surface and to the interior areas of the pores of the aluminum transition oxide at such a uniform distribution that calcination for the purpose of further homogenizing the components is unnecessary.

Other features which are considered as characteristic for the invention are set forth in the appended claims.

Although the invention is described herein as embodied in a process for the preparation of an ion-conducting ceramic material, it is nevertheless not intended to be limited to the details given, since various modifications may be made therein without departing from the spirit of the invention and within the scope and range of equivalents of the claims.

The method of operation of the invention, however, together with additional objects and advantages thereof will be best understood from the following examples.

Referring now to the invention in detail, it is noted that a starting material for preparation of a stabilized single-phase polycrystalline sodium beta''-aluminum oxide is an aluminum transition oxide or a mixture of various aluminum transition oxides. These aluminum transition oxides can also only be prepared from aluminum oxide hydrates or aluminum hydroxides by dehydroxylation. The starting materials for this purpose are preferably boehmite, gibbsite and baterite. Chi, kappa, gamma, delta, theta or eta-aluminum oxides are preferably used for the preparation of the stabilized beta''-aluminum oxide. These aluminum oxides develop pores by the dehydroxylation process. The dimensions of the interior areas of these pores are up to 200 m$^2$/g. In order to arrive at a phase-stabilized sodium beta''-aluminum oxide, the exterior and interior ares of the pres of this starting material are furnished with an impregnation layer according to the invention. The object of this impregnation layer is to maintain a uniform distribution of phase-stabilizing and ion conductivity-promoting components on the above areas which are incorporated, in a later reaction sintering operation of the starting material, in the crystal lattice of the aluminum transition oxides. Cations of magnesium, lithium, zinc, cobalt, nickel and iron are particularly suitable for achieving the desired phase stability. Cations of magnesium and lithium are especially suitable.

In order to form the desired impregnation layer on the interior areas of the pores and the exterior areas of the starting material, a solution is prepared from a chemical compound which contains, for example, magnesium or lithium as a component. A chemical compound is chosen for this purpose which is completely soluble, for example, in water. Alcohols and other solvents in which the chosen chemical compound is completely soluble can also be used as a solvent. The chosen chemical compound must additionally be decomposable in an oxygen-containing atmosphere at temperatures up to a maximum of 900° C. with conversion to the corresponding oxides. The chosen aluminum transition oxide or mixtures of various aluminum transition oxides that are initially mentioned above are ground to a powder having a particle size below 5 μm. Non-stabilized sodium beta''-aluminum oxide can be represented by the structural formula Na$_2$O.xAl$_2$O$_3$, in which x can have a value between 5 and 7. The lattice unit of the hexagonal sodium beta''-aluminum oxide is constructed in the crystallographic c-direction from three (Al$_{11}$O$_{16}$)$^+$spinal blocks, interrupted by two (NaO)$^-$planes which are responsible for the sodium ion conductivity. By incorporating the doping cations, the proportion of sodium ions in the conductivity planes is at the same time increase, in addition to phase stabilization, and the specific internal electric resistance of the $\beta''$-Al$_2$O$_3$ ceramic material is thereby reduced. A maximum proportion of doping elements in the $\beta''$-Al$_2$O$_3$ lattice is therefore worth aiming for. In order to achieve a uniform distribution of the phase-stabilizing cations, which can be formed, for example, by magnesium, magnesium nitrate hexahydrate (Mg(NO$_3$)$_2$.6H$_2$O) is dissolved in water.

Gamma-aluminum oxide is used as the aluminum transition oxide. The ratio of aluminum oxide to the magnesium compound as the doping component is 3.08:1. A slip is formed from the dopant, the aluminum transition oxide and water as a solvent. In order to form the slip, the ratio water to solids is at least 2.33:1. The slip produced from the above starting materials is wet-ground, so that a powder having a particle size below 5 μm is obtained after drying. The powder obtained in this way is then dried. Spray drying is recommended for this purpose. The exterior areas of the resultant powder and the interior areas of its pores are then furnished with a further impregnation layer in the form of alkali metal ions as the second component. In this way the cations, that are already applied and uniformly distributed, should become affixed to the areas and the alkali metal ions should also be uniformly distributed on the surface. To this end, the powder is stirred into sodium hydroxide solution. A further slip is formed from the above materials. The ratio of solids content to liquid content is governed by the concentration of the sodium hydroxide solution. A 0.5 N aqueous sodium hydroxide solution is used for the formation of the slip. The slip prepared by stirring is then wet-ground in such a way that the powder formed has a particle size of below 5 μm. Due to the effect of the sodium ions, the cations, that are already located on the interior areas of the pores and the exterior areas of the powder, are permanently affixed to the surface in the form of insoluble magnesium compounds. The powder produced in this way can then be used for the manufacture of solid electrolytes which are incorporated as sodium ion conducting walls in storage batteries. The green bodies produced from the powder are reaction-sintered at a temperature of up to 1650° C. In this way, the phase-stabilizing cations deposited on the interior areas of the pores and the exterior areas of the ceramic material as well as the sodium ions are incorporated in the crystal lattice. The incorporation of the phase-stabilizing cations in the crystal lattice is aided by their optimum distribution. Their content in the $\beta''$-aluminum oxide phase is thereby greatly increased. As a result, more sodium ions can be incorporated in the lattice at the same time, which strongly increases the conductivity of the ceramic material. The sodium beta''-aluminum oxide stabilized with magnesium ions can be represented by the following equation:

$$Na_{1+z}Mg_zAl_{11-z}O_{17},$$

with the maximum value of z being ⅔. If the phase stabilization is effected by lithium ions, the stabilized sodium beta''-aluminum oxide can be represented as follows:

$$Na_{1+z}Li_{0.5z}Al_{11-0.5z}O_{17},$$

with the value of z again being ⅔. In the formation of the impregnation layer, the possibility arises of creating a small excess of sodium of 1 to 5% to initiate the liquid phase sintering process. In the above example in which magnesium ions were used for phase stabilization, the ceramic material pressed from the resultant powder has the following composition after a reaction sintering operation at 1650° C.:

$$Na_{1.67}Mg_{0.67}Al_{10.33}O_{17}.$$

If a doping component is used for the phase stabilization which cannot be precipitated by the sodium component, it is possible to dispense with the formation of the second slip. The sodium component can then at once be integrated into the preparation of the first slip. If the doping component intended for phase stabilization is obtained from an organometallic compound, then two slips must also be formed, since after the preparation and drying of the first slip, baking of the organic portion must be carried out in an oxygen-containing atmosphere at temperatures of 200° to 600° C. This is necessary in order to ensure that the interior pore volume becomes available for the uniform distribution of the sodium components on the interior areas of the pores.

I claim:
1. A process for the preparation of stabilized sodium beta''-aluminum oxide from aluminum transition oxides having a spinel defect structure, which comprises:
   forming a slip from aluminum transition oxides, a phase stabilizing doping component being an impregnation layer comprising cations of metals selected form the group consisting of magnesium, lithium, zinc, cobalt, nickel, and iron, wherein the ratio between the aluminum transition oxides and the phase stabilizing doping component is approximately 3.01:1, and a solvent selected from the group consisting of water and an alcohol;
   setting a ratio of solvent to solids to approximately 2.33:1;
   wet-grinding the slip to a particle size below 6.5 μm;
   drying the wet-ground slip to form a powder;
   preparing a further slip from the powder by mixing with a sodium hydroxide solution;
   wet-grinding the further slip to a particle size of below 5 μm for promoting conductivity and affixing the doping component on the exterior and interior areas of the pores of the aluminum transition oxides.
2. A process for the preparation of stabilized sodium beta''-aluminum oxide form aluminum transition oxides having a spinel defect structure, which comprises:
   forming a slip from aluminum transition oxides and a phase stabilizing doping component being an impregnation layer of magnesium nitrate hexahydrate in a ratio of 3.01:1, and a solvent selected from the group consisting of water and an alcohol;
   setting a ratio of solvent to solids to approximately 2.33:1;
   wet-grinding the slip to a particle size of below 6.5 μm and drying the wet-ground slip to form a powder;
   preparing a further slip from the powder and an admixed sodium hydroxide solution;
   subsequently wet-grinding the further slip to a particle size of below 5 μm for promoting conductivity and affixing the doping component on the exterior and interior areas of the pores of the aluminum transition oxide.

* * * * *